J. BORDWELL.
Self-Raker.
No. 218,615. Patented Aug. 19, 1879.
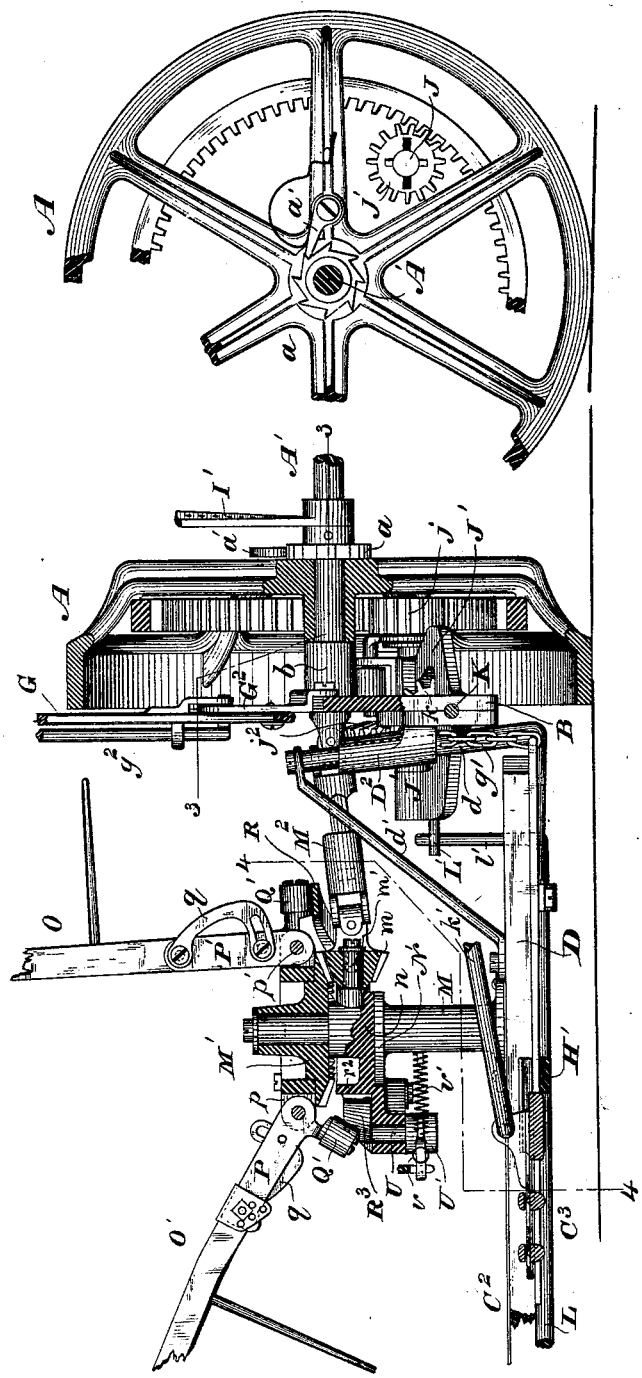
WITNESSES
INVENTOR
Joseph Bordwell,
By his Attorneys
Baldwin, Hopkins & Peyton.

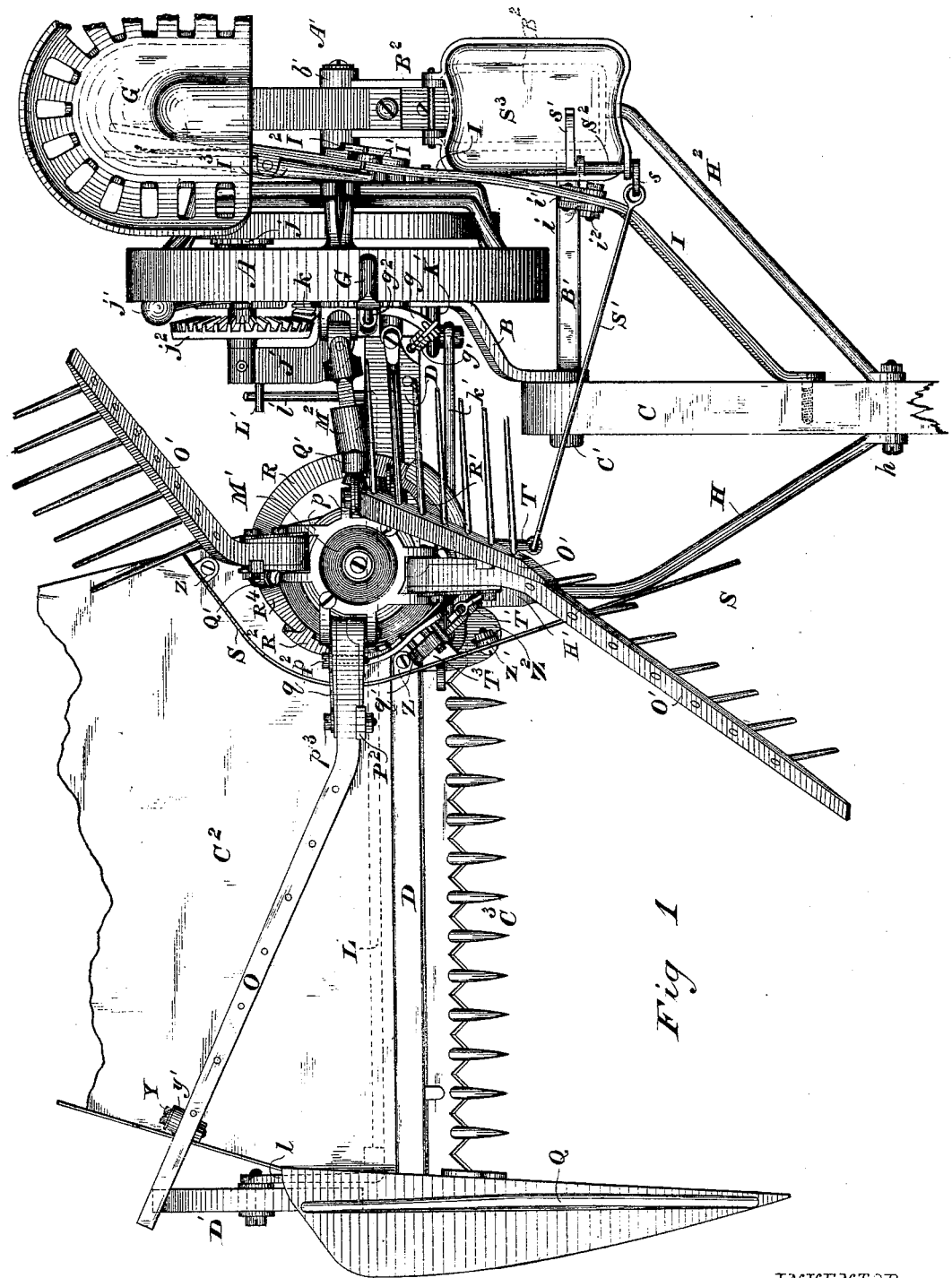

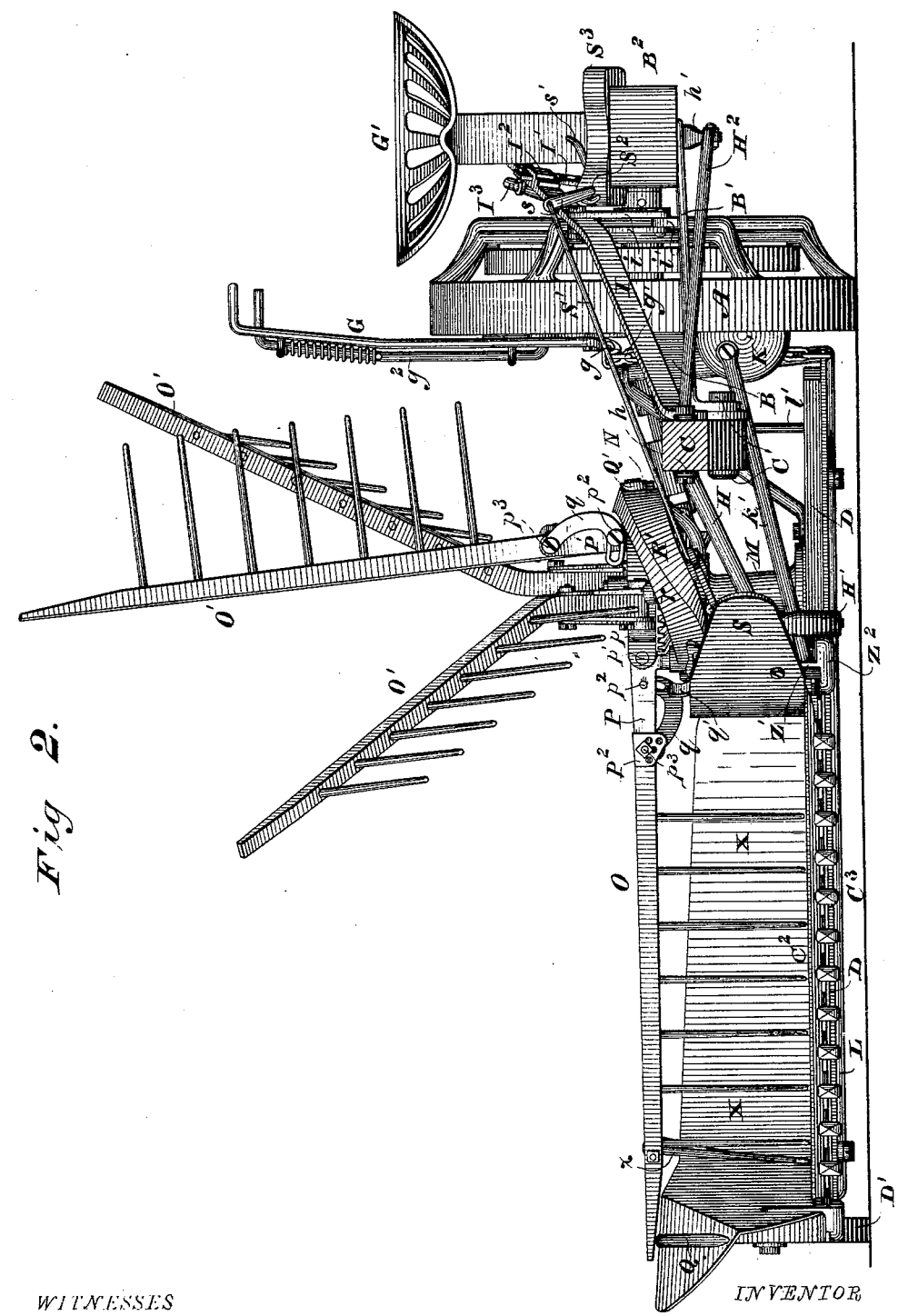

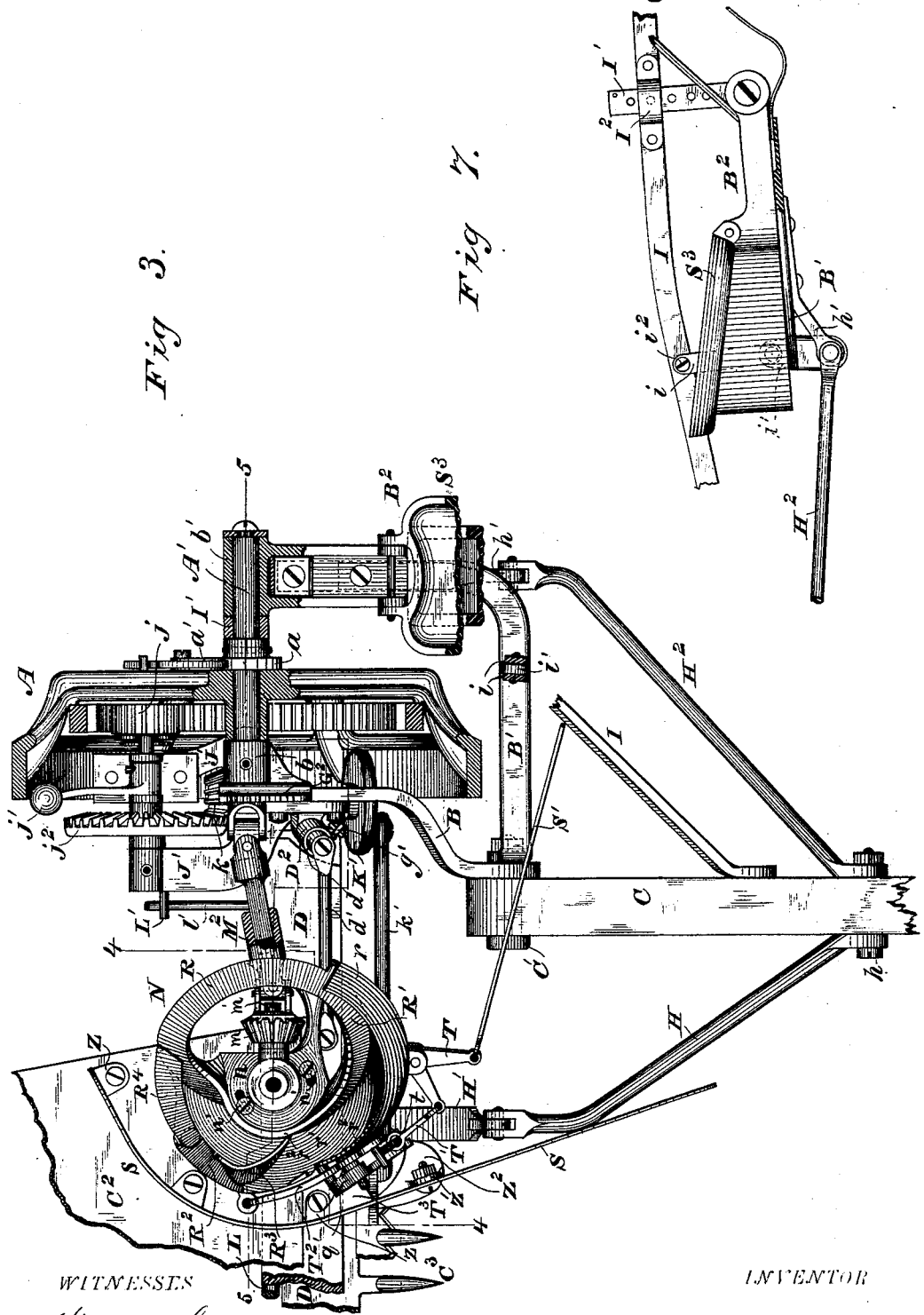

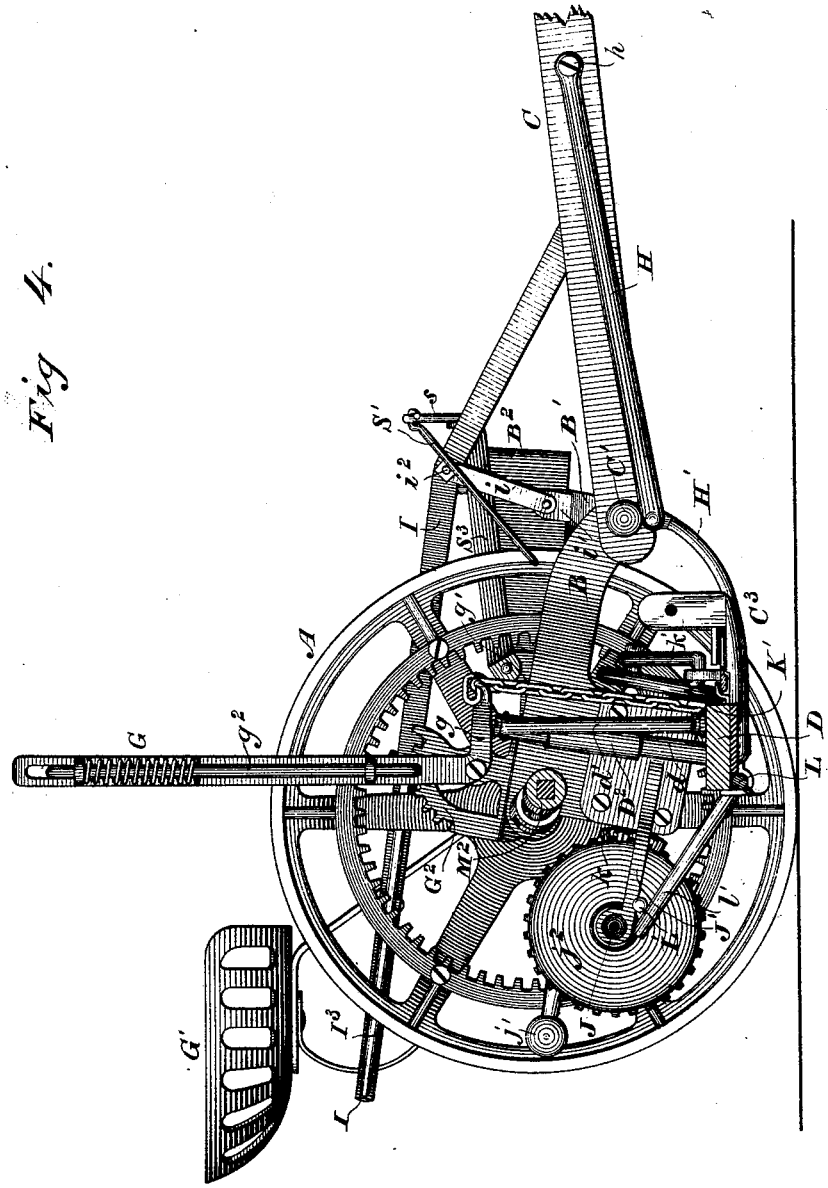

J. BORDWELL.
Self-Raker.
No. 218,615. Patented Aug. 19, 1879.
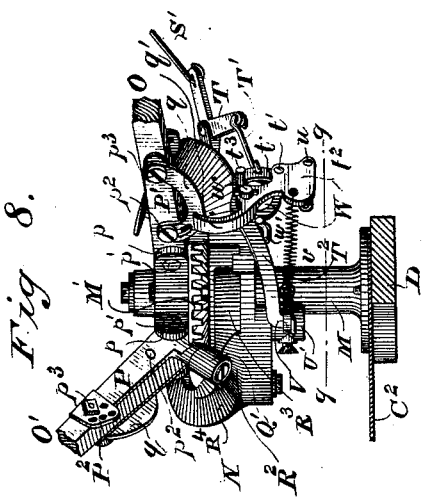
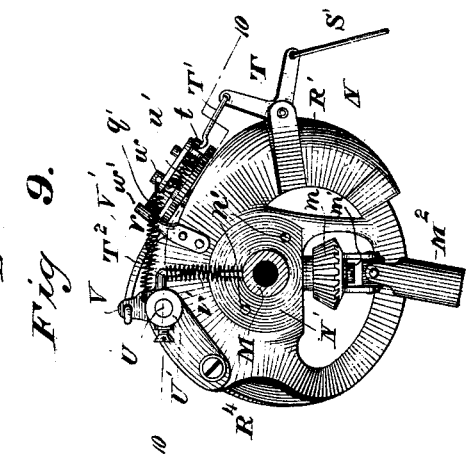
WITNESSES
Wm A Skinkle
Geo W Breck
INVENTOR
Joseph Bordwell
By his Attorneys
Baldwin, Hopkins & Peyton

UNITED STATES PATENT OFFICE.

JOSEPH BORDWELL, OF BROCKPORT, NEW YORK, ASSIGNOR TO DAYTON S. MORGAN, OF SAME PLACE.

IMPROVEMENT IN SELF-RAKERS.

Specification forming part of Letters Patent No. 218,615, dated August 19, 1879; application filed January 29, 1879.

*To all whom it may concern:*

Be it known that I, JOSEPH BORDWELL, of Brockport, in the county of Monroe and State of New York, have invented certain new and useful Improvements in Harvesters, of which the following is a specification.

My invention relates, generally, to improvements in grain-harvesters of the class provided with rising and falling reel and rake arms rotating about upright posts or vertical axes mounted upon adjustable finger-beams or grain-platforms at or near the heel ends of the cutting apparatus, and especially to that type of such class known as "single driving-wheel machines."

My object is to provide simple, strong, and easily operated adjustable connections between the cutting apparatus and platform and the main or supporting frame and draft-pole, to facilitate the tipping or rocking of the guards, to provide efficient raking and reeling devices thoroughly under the control of the driver, and generally to perfect and improve the machine.

My improvements consist in novel organizations of mechanism and combinations of devices hereinafter first fully described, and the subject-matter deemed novel then specifically claimed.

In the accompanying drawings I have shown all my improvements as embodied in a single machine. Obviously, however, some of my improvements may be used without the others, and in connection with machines differing in some respects from that therein shown and hereinafter specifically described.

Figure 1 is a plan or top view of my improved machine complete, with the exception of portions of the draft-pole, driver's seat, and platform, and Fig. 2 a front elevation thereof, these two figures being on a scale slightly smaller than that of the following figures. Fig. 3 is a view of a portion of the machine, partly in plan, with parts broken away and the rake and reel arms and their carrying-wheel removed, and partly in vertical section on the line 3 3 of Fig. 5. Fig. 4 is a view, partly in elevation and partly in vertical section, on the lines 4 4 of Figs. 3 and 5, the rake-post being entirely omitted. Fig. 5 is a vertical section on the line 5 5 of Fig. 3, with the raking and reeling mechanism in position. Fig. 6 is a view in elevation of the driving-wheel and its gear-connections as seen from the outside, with the main axle in section and parts of the wheel broken away. Fig. 7 is a detail view showing the foot-board, tool-box, and connections as seen in elevation from the outer or stubble side of the machine, with the seat-spring socket beneath the tool-box in section. Fig. 8 is an elevation, as seen from the inner or grain side of the machine, of the supporting and controlling mechanism for the rake and reel arms; Fig. 9, a bottom view or inverted plan of the same, with the rake-post in section on the line 9 9 of Fig. 8; Fig. 10, a detail, partly in section, on the line 10 10 of Fig. 9, showing the rake-tripping devices, controlling-levers, &c., as seen from within or from that side next the cam-track. Fig. 11 is a vertical longitudinal section on the line 11 11 of Fig. 12 through the inner end of one of the rake or reel arms, a portion of the arm being broken away to show more clearly the two short arms or metallic clamping-plates for securing the rake-arm, and which carry lugs to engage the bosses of the crown-wheel and a roller to traverse the cam-track; Fig. 12, a section on the line 12 12 of Fig. 11. Fig. 13 is a detail view, showing an elevation of the outer end of the rake-arm with its spring-finger or rake-tooth; Fig. 14, a similar view with the cap or cover for securing the spring retaining-ring in place removed; and Fig. 15, a horizontal section on the line 15 15 of Figs. 13 and 14.

A single driving and main supporting wheel, A, is made dish-shaped, or with a broad flanged tread, curved spokes, and open at one side, to surround and protect the gearing as usual. The driving-wheel is loosely mounted on a long or through axle, A'—that is to say, a main axle which is supported at or near its opposite ends at the sides of the wheel, in contradistinction to a stud-axle or one supported in a single bearing or on one side only of the wheel.

The main through-axle turns at its ends in suitable bearings $b$ $b'$ in the suspended main frame, which is made in sections, and consists of an inside portion having the forwardly-projecting angle-plate or doubly-bent bar B extending from the inside bearing, $b$, the outside bent rod, $B^1$, and the foot-board and tool-box $B^2$, terminating at rear in the outside bearing, $b'$, for the main axle. The outside main-frame bar, $B^1$, is rigidly bolted beneath the tool-box and the shank or arm with which it is formed, so that practically the outside portion of the main frame thus made up of the cast-iron tool-box and foot-board and wrought-iron bar answers the same purpose as though made of a single piece. This outside bent bar, $B^1$, crosses in front of the drive-wheel, and is provided with a short downwardly-projecting arm or lug at its inner end, where it is strongly jointed to the inside of the heel end of the tongue or draft-pole C, which terminates well in advance of the axle $A'$ by a pivot-bolt, $C^1$, which serves also to connect the downwardly-projecting front end of the inside frame-bar, B, with the tongue and bar $B^1$. The main frame is thus flexibly connected to the tongue-heel inside and in advance of the driving-wheel, so as to be capable of rocking about its pivot thereon, as will hereinafter more fully be explained.

The main frame is below or depends from the axle, it will be seen.

The grain-platform $C^2$ and cutting apparatus $C^3$, of suitable and well-known construction, are supported at opposite ends of the finger-beam D by a grain-wheel, $D^1$, adjustable relatively to the platform and cutting apparatus, and by jointed connections with the main frame and draft-pole, in such manner that the cutting apparatus and platform may be raised and lowered and the finger-beam be rocked about its longitudinal axis to tilt the guards and raise or depress their points for a well-known purpose.

The finger beam D is provided at its heel end with a nearly upright rod or post, $d$, inclining slightly inward or toward the platform. A diagonal brace, $d'$, secured at its opposite ends to the finger-beam and top of the post, respectively, strengthens the post, which is mounted in a sleeve-bearing or tubular bracket, $D^2$, on the inside of the gearing-supporting portion of the main frame, or that portion from which the bent piece B projects. The post $d$ may be caused to move endwise in the main-frame bracket, but has no other movement independently thereof.

A lever, G, projecting upward inside of and above the tread of the driving-wheel and to within easy reach of the driver in his seat $G^1$, outside of the wheel, serves to raise and lower the finger-beam, and with it the cutting apparatus and platform. This lifting-lever is provided with a toe or short arm, $g$, at its lower end, which is flexibly connected by a chain, $g^1$, with the heel of the finger-beam. The lever is pivoted at its lower end, at the heel of its toe, upon a toothed bracket, $G^2$, with which a spring-detent, $g^2$, on the lever engages in a well-known way. A peculiar socket is provided in the outer end of the lever-toe $g$, (best seen in Figs. 1 and 4,) the toe being forked and recessed in such manner that a chain-link, when crossed above the toe end, will be drawn partially into the socket thus formed and locked against accidental displacement. The chain may be quickly lengthened or shortened to suit the height of cut simply by detaching it from the lever, crossing a link at the proper point in the chain's length, and then drawing this crossed link in place.

The finger-beam D is connected with the tongue by a diagonal brace-bar, H, which is pivoted at its rear end to the point of a supplementary shoe, $H^1$, and joined at front to the tongue some distance in advance of its heel by a pivot-bolt, $h$, which serves also to connect with the tongue the forward end of a corresponding brace-bar, $H^2$, on the outside. This outside brace-bar extends rearwardly and outward to a point beneath the tool-box $B^2$ and outer bent frame-bar, $B^1$, where it is pin-jointed to a down-hanger or short arm, $h'$, in line with the joint $C^1$, between the heel of the tongue and the main frame, and in the same vertical plane, or nearly so, as the joint between the extra shoe $H^1$ and inside brace-bar, H. By this construction the main frame, and with it the finger-beam and platform, may be rocked to a limited extent about the heel of the tongue to tip the guards while admitting of the free vertical movement to the required extent of the finger-beam.

To enable the driver to rock the finger-beam about its longitudinal axis, and to secure it in the desired position, I provide a long bent lever, I, connected at its front inwardly-projecting end to the inside of the draft-pole in advance of its jointed heel-connection with the frame and near the outer end of the brace $H^2$.

The lever is mounted on a rocking or self-adjusting fulcrum on the outside bar, $B^1$, of the main frame at the inside of the foot-board and tool-box $B^2$. Two bars or links, $i\ i$, pivoted at their lower ends to a lug, $i^1$, on the bar, and connected at their upper ends by the bolt $i^2$, which joins them with the lever, serves as the adjustable fulcrum in this instance.

An arm, $I^1$, projecting upward from its sleeve, loosely enveloping the main axle, is provided with a series of holes at suitable distances apart from top to bottom, and is embraced by a loop, $I^2$, on the side of the lever.

A spring-detent, $I^3$, may be caused to engage any one of the series of holes in the retaining-arm $I^1$ to hold the parts in the adjusted position. This arm is free to rock on the axle to conform to the rocking movements of the lever-fulcrum when the lever is being adjusted.

The collar or bearing of the arm $I^1$ fits on the axle between the backing-ratchet $a$ and axle-bearing $b'$. A spring-pawl, $a'$, secured to the driving-wheel, engages the backing-ratchet fast on the axle when the machine is advancing, and causes the axle to turn with the wheel, the wheel being left free to revolve on the axle when the machine is backed, as usual.

The inside or gearing-supporting portion of the main frame is in some respects similar to the corresponding portions of the machines shown in Letters Patent of the United States Nos. 175,511 and 205,235, respectively, dated March 28, 1876, and June 25, 1878, granted Dayton S. Morgan, as assignee of William H. Seymour and as my assignee. Both these patents, as well as United States Letters Patent granted said Seymour November 23, 1869, No. 97,126, show two-wheel hinge-joint mowing-machines having the cutting apparatus actuated by vertical crank-shafts driven from bevel-pinions mounted on counter-shafts above the main axles.

In the organization of mechanism by which I adapt such features of said patented machines as I employ to a one-wheel reaping-machine, I locate both the counter-shaft and the crank-shaft wholly below the level of the main axle and drive the cutters by a horizontal crank-shaft, thus accommodating the rake-actuating tumbling-shaft, hereinafter to be described; also, providing for the connection between the main frame and finger-beam, before described, and attaining other objects sought after, such as accommodation for the lever G and its connections.

Such parts of the frame and gearing as it is deemed necessary to describe, in view of the said patents to Seymour and myself, to give a proper understanding of my invention, will now be referred to.

The counter-shaft J is mounted in bearings in the forked rear portion or arms, J′ J′, of the main frame behind and beneath the level of the axle A′. An endwise-moving pinion, $j$, on the counter-shaft, controlled by shifting-clutch mechanism and a lever, $j^1$, and driven by the internal main gear on the driving-wheel, has a bevel-pinion, $j^2$, as in Patent No. 205,235.

The crank-shaft K is provided with a pinion, $k$, at its rear end, between and close to the juncture of the rearwardly-projecting arms J′ J′ of the main frame. This pinion meshes with the counter-shaft pinion $j^2$. The crank-shaft extends forward horizontally, or nearly so, beneath the outer end of the main axle, and drives the cutters by the low-down crank-wheel K′ and the pitman $k'$ in or about in line with the cutters. The crank-shaft is quite short, and is mounted in a bearing formed between two firmly-connected frame-plates (see Fig. 5) beneath and near the lower end of the bracket-bearing $D^2$ for the finger-beam post $d$. The inclination of the post prevents cramping or injurious end-thrust on the pitman as the finger-beam is raised and lowered.

To cause the elevation or lowering of the grain-wheel $D^1$ relatively to the platform and cutting apparatus, and simultaneously with the raising or lowering of the heel end of the finger-beam by the lever G, and thus prevent injurious strain on the beam, I have adopted certain features invented by Thomas Motley, and shown and claimed in his application for Letters Patent of the United States, filed simultaneously herewith, for improvements in harvesters.

The said improvements of Motley consist of a long rock-shaft, L, mounted in bearings beneath the platform, on the under side or at the rear edge of the finger-beam D, and with correspondingly-cranked or rearwardly-projecting inner and outer ends, $l\ l'$. The grain-wheel is supported upon a stud-axle at the outer end of the crank or arm $l$, and the crank-arm $l'$ bears at its rear against the under side of a laterally-projecting stop or short arm, $L^1$, on the forked rear portion, J′, of the main frame. The weight of the platform and cutting apparatus keeps the crank-arm $l'$ up to the stop throughout all the adjustments of the finger-beam.

Instead of the rock-shaft abutting by its crank $l'$ against the frame, I had, prior to the adoption of the said invention of Motley, contrived to connect the lifting-lever by a rearwardly-projecting bent arm or horn with the crank $l'$. Finding, however, that the change improved the machine, I adopted the Motley features in lieu of my own devices for accomplishing the same result, and do not claim said devices herein.

The raking and reeling devices are mounted on a short post or standard, M, at or near the inner front corner of the grain-platform $C^2$, and near the heel end of the finger-beam D. An inverted beveled toothed wheel, $M^1$, to which the rake and reel arms are pivoted, is mounted upon the rake-post so as to revolve freely about its upper end, as usual. A bevel-pinion, $m$, mounted on a stud-axle, $m'$, at the side of the rake-post, meshes with the rake-carrying wheel $M^1$, and is driven by an extensible universally-jointed or tumbling shaft, $M^2$, coupled at its opposite ends to the inner end of the main axle A′ and to the pinion $m$. The tumbling-shaft extends from the axle above the low crank-shaft to the pinion $m$, and passes between the low-down counter-shaft pinion and the bracket-bearing $D^2$ for the post, by which the heel end of the finger-beam is jointed to the main frame.

A controlling-cam or rake-track plate, N, is secured by its centrally-open base $n$ upon a flange or collar, N′, surrounding and fast on the post M below the wheel $M^1$. (See Figs. 3, 5, and 9.) Set-screws $n'\ n'$, passing through elongated curved slots in the cam-base and into taps in the seat-flange or cam-supporting collar N′, serve to secure the cam, when adjusted in its desired position, by turning it horizontally about the rake-post, by means of its centrally-open base or bearing $n$. In this way the reel-arms may be caused to enter the standing grain sooner or later, or near to or well in advance of the cutters, to suit the condition of the crop, as will be understood, without interfering with the operation of the raking devices, &c.

In the present instance one rake-arm proper or head, O, and three reel-arms proper or heads, O' O' O', are shown; but, obviously, the total number of arms may be increased, and two or more rake-arms be employed. The connections between the several arms O O' and the carrying or driving wheel $M^1$ are all alike, and but one of these connections need, therefore, be described. Lugs or ears $p\ p$, projecting laterally from the vertical annular rim or flange on the top of the wheel $M^1$, serve, as usual, to pivot the arms at their heels.

The arm is secured between two short metallic arms or side clamping-plates, $P\ P^1$. The pivots or opposite trunnions $p^1$ at the heels of these short arms or side plates serve to hinge them in the ears $p\ p$. The arm O or O' is secured at its inner end between the short arms by the through-bolts $p^2\ p^3$, near the heels and outer ends, respectively, of the arms $P\ P^1$. A washer or adjustable clamp-piece, $P^2$, flanged at its top, is provided with a series of holes to suit it to fit upon the bolt $p^3$ in the various adjustments of the rake and reel arm in the connecting-arms $P\ P^1$. In this way any one or all of the rake and reel arms may be raised or lowered at their outer ends to cause them to strike upon the guide-rail Q on the divider at the outer end of the finger-beam and be guided properly to the platform. The side plate or short arm P has a downwardly-projecting short shaft or stud-axle for the roller Q', which traverses the cam-track, presently to be described, and the opposite short arm or side plate, $P^1$, of the pair has a tripper-piece or bow-shaped pivoted arm, $q$. This tripper-piece is slotted at its inner or free end, and adjustable upon the through-bolt $p^2$, as will readily be understood by inspection of the drawings. At its opposite or heel end it is pivoted upon the through-bolt $p^3$. The tripper for the rake-arm O is caused to project downward a sufficient distance to bring it in contact (once during each revolution of the arm) with a tripping-latch, $q'$, when in its normal position, as will hereinafter be explained, while the trippers on the reel-arms are so adjusted by their respective securing-bolts $p^2$ and the pivot-bolts $p^3$ as to elevate them sufficiently far above the cam-track to clear the tripping-latch. One or more of the reel-arms may be converted into a rake-arm by adjusting the tripper downward, so as to correspond with that on the rake.

As will hereinafter be explained, when the tripper $q$ is properly set, by adjusting it by movement upon or independently of the combined reel and rake arm and its side plates, the arm operates regularly or automatically as a rake without attention from the driver; yet he may, when it is desirable to do so, intermit this operation and cause the arm to act as a reel—say, at alternate revolutions—without readjustment of the tripper.

The cam N, for convenience of description, will be divided into five parts—viz., a main part or long fixed track, R, a fixed walled or recessed part and partly-covered way, $R^1$, a short fixed part, $R^2$, and two movable sections, pivoted gates, or swinging latches, $R^3$ and $R^4$, at opposite ends of the short fixed section $R^2$ of the track. The regular traverse of the rollers Q' of the reel-arms, and the roller of the rake-arm also when this arm acts simply as a reel-arm, is taken as a starting-point, the rearmost arm shown as just passing over the platform in Fig. 1, as follows: The roller Q' first passes along the inclined top surface of the rear or free end of the gate $R^4$ to the fixed main part R, where it, for a short distance, rides upon the at first gently-inclined surface of this fixed portion of the track, and thence along its central, level, or nearly level, part to the recessed part $R^1$. It then passes beneath the top wall or hood, $r$, which draws down the arm as it continues to turn, and advances down the curved or inclined part of the track to the bottom or lowest part, $r^1$, of the track, between the side walls, $r^2\ r^2$, and from there to the outside of the front cam-latch or gate, $R^3$, outside of which it traverses, and past the incline-surfaced short fixed section $R^2$ to the heel or pivoted end of the gate $R^4$, up the inclined surface of which it moves to the starting-point, and so on.

The cam-latches or swinging gates $R^3$ and $R^4$ are beveled transversely, or have laterally-inclined top or outer surfaces, as clearly shown by the drawings, and are respectively pivoted at their heels, so as to swing about vertical, or nearly vertical, axes at the front and rear ends of the short fixed part $R^2$ of the cam-track.

The tripping-latch $q'$, by which to cause the rake to descend upon and sweep around the platform to discharge a gavel, is located inside the inner fence or fender, S, and it and its connections are constructed and operate as will now be described.

A connecting rod or link, $S^1$, is jointed at one end to a rock-shaft, $S^2$, mounted in bearings, so as to be capable of rocking freely vertically to the desired extent on the front inner corner of the hinged foot-board or cover $S^3$ of the tool-box $B^2$. The front crank or bent end, $s$, of this rock-shaft has the connecting-rod linked to it, while the rear bent end or crank, $s'$, serves as a foot-lever for the driver to control the rake, as will presently appear.

An elbow or bell-crank lever, T, is pivoted to the under side of the cam N in front of the rake-standard M, and beneath the portion $R^1$ of the cam-track.

The link-rod $S^1$ is connected at its end opposite that linked to the rock-shaft $S^2$ with one arm or end of this lever T, and the other arm of the lever is connected by a short link-rod, $T^1$, with a vertically-rocking trip-arm or pivoted spring-dog, $t$. This trip-arm or dog is pivoted, as at $t^1$, toward its lower or heel end, upon the inner side of the broad lower end or head, $t^2$, of the tripping-latch $q'$.

The short link $T^1$ connects with the trip-dog near its top or free end, and at top this dog is notched or formed with a rounded recess, so that when it is caused to abut against a pin or lug, $t^3$, on a cam-gate-actuating arm, $T^2$, it will be prevented from slipping sidewise on or becoming disengaged from said pin.

The trip-dog $t$ abuts at the front of its heel against a stop-pin, $u$, on the inside of the tripping-latch head or lower end, $t^2$, and the backward movement of the upper end of the dog is in this way limited, so as to guard against its being swung back beyond the position for properly engaging the side pin, $t^3$, of the cam-gate-actuating arm $T^2$.

A coiled spring, $u'$, acts against the heel of the dog on the side opposite the stop $u$, and yieldingly holds it against said stop when in its normal position.

A laterally-projecting clip or lug, $T^3$, on the inside of the fender S abuts against the rear edge of the heel or head $t^2$ of the vertically-rocking tripping-latch $q'$, and thus prevents said latch from rocking too far forward at its point or upper end.

The curved cam-latch or swinging gate $R^3$ is pivoted at its bend or angle—that is to say, at the juncture of its front and main part and its short bent part or heel—upon a vertical pivot or axis, U, passing down through an opening or bearing in the cam, and having upon it, beneath the cam, an adjustable collar or detachable head, U', secured by a set-screw. This collar has two short arms or lugs, V V', projecting at right angles from it at a distance apart about equal to a quarter of the circumference of the collar. A light or weak coiled spring, $v$, links the outside arm (the one, V, which projects toward the fender or inner fence) with the rear of the tripping-latch head or weighted heel $t^2$, and a stronger coiled spring, $v'$, links the forwardly-projecting arm V' with the rake-standard M.

The latch-actuating arm $T^2$ is jointed at one end to the collar-arm V, and at its opposite or front end it is enlarged, or spreads out vertically, and has an irregular slot or transverse opening, W, in it in rear of and beneath its pin $t^3$. The pivot $w$ of the tripping-latch $q'$ passes through this slot. A stop-pin, $w'$, in rear of the tripping-latch pivot serves to limit the accidental descent of the arm $T^2$ and tripping-latch $q'$ beyond the proper point.

From the above description, and by the aid of the drawings, it will be seen that so long as the driver keeps his foot off the lever $s'$ of the rock-shaft $S^2$ the tendency of the spring $v$ to shorten or contract keeps the heel or head $t^2$ of the latch-tripper rocked backward against the fender-stop $T^3$, and at the same time the stop-pin $u$ and expansive spring $u'$ of the dog $t$ keep it in proper position to abut against and push up the side pin, $t^3$, of the actuating-arm when the bowed arm or striker $q$ of a rake-arm strikes the tripper $q'$ and rocks it backward.

When so struck the forward rocking movement of the heel or head $t^2$ of the latch-tripper and the upward movement of the dog releases the top notch or detent of the slot W of the actuating-arm from the pivot $w$, and this arm moves backward a short distance to bring its lower notch or detent in contact with the pivot. This endwise backward movement of the actuating-arm $T^2$ when released, is given it by the expansive force or lengthening of the spring $v'$, and the consequent partial revolution of the vertical pivot or gate axis U and its collar, to the arm V' of which, the spring is connected. This turning movement of the pivot U instantly throws out the cam-gate $R^3$, and closes the regular or reel-traversed portion of the cam-track outside of this gate, thus causing the rake-arm roller Q' to traverse the track inside the gate and bring the rake down on the platform.

When the roller strikes and rides along in contact with the heel end of the gate on its way to the simply pivoted second gate, $R^4$, the pivot of the gate $R^3$ is turned back to its starting or normal position, the pivot-collar U' and its arms V V' being rocked in a direction the reverse of that before described. The rake-arm roller having thus reset or closed the first gate next traverses inside the second gate, $R^4$, and swings it out as the roller passes on toward and enters upon the fixed part R of the track, and then ascends after leaving the platform and depositing the gavel on the ground, to clear the drive-wheel and driver in his seat. The driver, by bearing with his foot upon the lever of the rock-shaft $S^2$, can draw forward the dog $t$, so that the rocking movement of the tripping-latch will not actuate the gate-controlling arm $T^2$.

The rake-arm O is provided at its outer end with a self-adjusting pivoted tooth, $x$, which sweeps close into or against the grain-fence X, so as to insure a clean sweep of the grain from the platform without necessitating the formation of said fence on a true curve or concentric with the axis of revolution of the rake or the path described by its outer end or the fixed tooth nearest the fence.

The tooth $x$ (see Figs. 13, 14, and 15) may be provided on one or more of the reel-arms to adapt them to operate as rakes instead of upon the one rake-arm O, as shown by the drawings.

The tooth is acted upon by a spring, which gives it a tendency to move outward at its lower end, and thus travel close to the grain-fence or outer guard of the platform $C^2$. The tooth is perforated or formed with an eye at its upper end, through which, as well as through the rake-arm, passes the headed pivot-bolt Y close to the adjacent fixed tooth $x'$.

A nut at one side of the rake-arm secures the thread pivot-bolt in place and draws its head up against a shouldered cap-piece or plug, $y$, the plug or smaller portion of which cap enters a ring or collar, $y'$, while the outer or larger shouldered part fits against said ring and clamps it tightly to the side of the rake-arm. The end of the tooth $x$ enters the ring at its lower side by a notch or slot in its inner edge of a length sufficient to allow the requisite swing to the tooth while confining the play of the tooth within proper limits.

A spring, $Y^2$, is secured at its upper end in the slot in the side of the ring, and is attached to and bears at its lower end against the inner side of the rake-tooth $x$, acting always with a tendency to throw the tooth outward or against the grain-fence at its lower end. By means of this spring-operated tooth the lodging of grain against and close to the fence is prevented, as will readily be understood.

The inner grain guard or fender, S, is secured to the platform $C^2$, close to the rake-cam and its gate-actuating devices, to protect the latter from the grain. Several lugs or base-flanges Z upon the fender serve to bolt it to the platform, and its attachment is completed by means of a screw or bolt passing through it and an upright, $Z^1$, on the shoe $Z^2$.

Should the spring $r$ become too weak to perform its function or break, the stop $w'$ would prevent the latch $q'$ from being rocked backward by the blow of the rake to such an extent as to interfere with its return to its working position when released. The weight of the latch-head or weighted heel $t^2$ would cause it to rock back to its normal position.

Broadly considered, many of the features and combinations of parts embodied in my improvements are old and are not claimed by me. For instance, I do not broadly claim the combination, in a one-wheel machine, of the platform and cutting apparatus having the capacity of both vertical adjustment to vary the height of cut and rocking adjustment to tip the guards; nor do I broadly claim the combination of a main frame and the tongue, about the heel of which it rocks; nor driving the rake from the main axle by a tumbling-shaft; nor swinging cam latches or gates; nor, broadly, the combination of the vertically-operating latch-tripper and the cam-latch. It is deemed unnecessary to further enumerate old and well-known features embodied in my improvements, the claim being limited substantially to the subject-matter now to be designated.

I claim as of my own invention—

1. The combination, substantially as hereinbefore set forth, of the single driving-wheel, its through-axle, the inside bent bar of the main frame, the outside bent rod thereof, the inside and outside bearings for the axle, the tongue terminating at its heel in advance of the axle and inside the driving-wheel, the pivotal connection between the heel of the tongue and the inside bar and outside rod of the main frame, the finger-beam, its heel, post, the sleeve-bearing on the main frame, and the inside and outside diagonal brace-bars pivoted at their front ends to the tongue, and respectively connected by joints at their rear ends with the cutting apparatus and the main frame, for the purpose specified.

2. The combination of the main frame, the driving-wheel, its axle, the tongue pivoted at its heel to the main frame inside the driving-wheel, the cutting apparatus, the diagonal inner and outer brace-bars connected at their front ends with the tongue, and respectively jointed at their rear ends with the finger-beam and with the main frame outside the driving-wheel, the long lever, and its adjusting-fulcrum on the frame outside the driving-wheel, for tipping the guards, as set forth.

3. The combination of the tongue, the main frame rocking on the heel of the tongue inside and in advance of the driving-wheel, the diagonal inside and outside jointed brace-bars, the finger-beam, the cutting apparatus, the long lever connected with the tongue, its adjusting-fulcrum on the outside frame-bar, and the rocking retaining-arm on the axle for securing the lever, these members being and operating substantially as hereinbefore set forth.

4. The combination of the outside bent frame-bar, $B^1$, the inside bent frame-bar, B, the tongue pivoted at its heel to said bars, the driving-wheel, its axle, from which the main frame is suspended, the long lifting-lever, its fulcrum on the outside frame-bar, and the rocking-lever-retaining arm on the axle, inside the outer bearing thereof, substantially as hereinbefore set forth.

5. The combination of the stop-pin $w'$, with the vertically-operating tripping-latch pivoted, at or near its middle, at the side or edge of the cam-plate, and having the broad lower end or heavy head carrying a trip-arm or spring-dog, operating to dog and release a cam-gate-actuating arm, substantially as and for the purpose described.

6. The combination, substantially as hereinbefore set forth, of the vertically-operated tripping-latch pivoted at the side or edge of the cam-plate, the trip-arm or spring-dog pivoted upon the lower end or head of the said latch, the cam-gate-actuating arm operated by said spring-dog, the pivot of said gate connected with the actuating-arm, and the spring serving to turn the pivot of the gate when released by the actuating-arm, for the purpose described.

7. The combination, substantially as hereinbefore set forth, of the rock-shaft, its foot-lever, the link-rod, the bell-crank lever, the trip-arm or spring-dog, the tripping-latch, to the lower end or head of which the spring-dog is pivoted, the lug on the fender acting as a stop for the tripping-latch, the spring which normally keeps the heel of said latch up to said stop, and the cam-latch-actuating arm, automatically operated by the movement imparted to the spring-dog by the rake when the foot-lever is released by the driver, as described.

8. The combination of the rake-arm provided with a tripper-piece, the pivoted tripping-latch actuated thereby, the cam-latch mounted upon a vertical pivot, the actuating-arm connected at one end with said pivot, and holding it against the force of its spring, and slotted at its opposite end to embrace and engage the pivot of the tripping-latch, the trip-arm or spring-dog pivoted on the lower end of the tripping-latch, and the weak spring connecting the said latch with the pivot of the cam-latch, these members being and operating substantially as hereinbefore set forth.

9. The combination of the cam-latch $R^3$, its pivot, the arms V V', the spring connecting one of said arms with the rake-post, the lighter spring connected at one end with the remaining arm, the rocking tripping-latch, to which the opposite end of said spring is connected, the actuating-arm connected at its opposite ends with the cam-latch, pivot, and tripping-latch, and the spring-dog, these members being and operating substantially as hereinbefore set forth.

In testimony whereof I have hereunto subscribed my name.

JOSEPH $\overset{\text{his}}{\times}$ BORDWELL.
mark.

Witnesses:
E. T. LAMB,
H. S. MADDEN.